(12) United States Patent
Barney

(10) Patent No.: US 11,839,203 B2
(45) Date of Patent: Dec. 12, 2023

(54) FISHING ROD SAND SPIKE HOLDER CARRY SYSTEM

(71) Applicant: Julie Ann Barney, Vero Beach, FL (US)

(72) Inventor: Julie Ann Barney, Vero Beach, FL (US)

(*) Notice: Subject to any disclaimer, the term of this patent is extended or adjusted under 35 U.S.C. 154(b) by 89 days.

(21) Appl. No.: 17/147,060

(22) Filed: Jan. 12, 2021

(65) Prior Publication Data
US 2021/0212303 A1 Jul. 15, 2021

Related U.S. Application Data

(60) Provisional application No. 62/959,982, filed on Jan. 12, 2020.

(51) Int. Cl.
| | | |
|---|---|---|
| *A01K 97/10* | (2006.01) | |
| *A01K 97/08* | (2006.01) | |
| *A45F 3/44* | (2006.01) | |
| *A45F 5/10* | (2006.01) | |
| *B65D 21/02* | (2006.01) | |

(52) U.S. Cl.
CPC ............. *A01K 97/10* (2013.01); *A01K 97/08* (2013.01); *A45F 3/44* (2013.01); *A45F 5/10* (2013.01); *B65D 21/0204* (2013.01)

(58) Field of Classification Search
CPC ........... A01K 97/08; A01K 97/10; A45F 3/44; A45F 5/10; B65D 21/0204; B65D 71/0003; A47G 23/0216; A47G 23/02; A47G 23/0208; A47G 23/0241

USPC .......................................................... 43/21.2
See application file for complete search history.

(56) References Cited

U.S. PATENT DOCUMENTS

| | | | | | |
|---|---|---|---|---|---|
| 2,749,645 | A | * | 6/1956 | Mckern ................. | A01K 97/08 206/315.11 |
| 3,339,869 | A | * | 9/1967 | Andersen ............... | A01K 97/10 248/156 |
| 3,759,596 | A | * | 9/1973 | Bergmeyer ......... | B65D 21/0204 312/244 |
| 4,014,466 | A | * | 3/1977 | Wess ...................... | A01K 97/08 294/166 |
| 4,133,445 | A | * | 1/1979 | Mandelbaum ..... | B65D 21/0204 206/537 |
| 4,154,274 | A | * | 5/1979 | Adamson ............... | A63B 55/10 294/159 |
| 4,257,181 | A | * | 3/1981 | Cooper .................. | A01K 97/10 248/530 |
| 4,523,704 | A | | 6/1985 | Washington | |
| 4,572,416 | A | * | 2/1986 | Upham ..................... | B60R 9/08 224/326 |
| 4,697,780 | A | * | 10/1987 | Wenkman ............. | F16M 11/041 248/314 |
| 4,871,099 | A | * | 10/1989 | Bogar, Jr. .............. | A01K 97/10 248/512 |

(Continued)

FOREIGN PATENT DOCUMENTS

| | | | | | |
|---|---|---|---|---|---|
| KR | 890004438 Y1 | * | 7/1989 | ............. | A01K 97/10 |
| KR | 0137498 Y1 | * | 2/1992 | ............. | A01K 97/10 |
| WO | WO-0158257 A1 | * | 8/2001 | ............. | A01K 97/01 |

*Primary Examiner* — Taylor Morris

(57) ABSTRACT

The present invention relates to a device rod holding apparatus, comprising, a number of hollow pipes for holding the fishing rods, connection assemblies for griping the pipes together, a handle for carrying the apparatus with single hand and a container for holding various objects.

1 Claim, 13 Drawing Sheets

(56) References Cited

U.S. PATENT DOCUMENTS

| | | | | |
|---|---|---|---|---|
| 4,940,137 A * | 7/1990 | Straub | B65D 71/50 | 206/139 |
| 5,105,958 A * | 4/1992 | Patton | A63B 55/408 | 215/229 |
| 5,533,295 A * | 7/1996 | Hochberger | A01K 97/10 | 248/512 |
| 5,546,693 A * | 8/1996 | Stockton | A01K 97/10 | 248/514 |
| 5,692,720 A * | 12/1997 | Griggs | A45B 23/00 | 248/512 |
| 5,715,952 A * | 2/1998 | Chichetti | A01K 97/10 | 248/512 |
| 5,803,519 A * | 9/1998 | Daigle | A01K 97/08 | 294/169 |
| 5,836,103 A * | 11/1998 | Taylor | A01K 97/08 | 43/26 |
| 5,904,281 A * | 5/1999 | Mooers | B60R 9/08 | 224/525 |
| 5,992,717 A * | 11/1999 | Clewes | A01K 97/10 | 224/584 |
| 6,003,748 A * | 12/1999 | Rivenbark | B60R 9/08 | 224/319 |
| 6,478,371 B1 * | 11/2002 | Clarke | A47G 23/0225 | 297/188.2 |
| 6,672,559 B1 * | 1/2004 | Boldia | A01K 97/10 | 248/538 |
| 7,937,883 B2 * | 5/2011 | Roemer | A01K 97/08 | 248/512 |
| 8,393,111 B1 * | 3/2013 | Johnson | A01K 97/10 | 43/21.2 |
| 8,801,064 B2 * | 8/2014 | Xiques | A01K 97/08 | 294/143 |
| 9,314,008 B2 * | 4/2016 | DeSpiegelaere | A01K 97/06 | |
| 9,532,559 B1 * | 1/2017 | Hemmerlin | F16M 13/02 | |
| 10,130,089 B2 * | 11/2018 | Pippins | A01K 97/125 | |
| 11,564,518 B2 * | 1/2023 | Barczyk | B65D 25/2802 | |
| 2005/0102881 A1 | 5/2005 | Legendziewicz | | |
| 2008/0000783 A1 * | 1/2008 | Faulkner | B65D 71/50 | 206/139 |
| 2008/0295383 A1 * | 12/2008 | Wakefield | A01K 97/10 | 43/21.2 |
| 2009/0119969 A1 * | 5/2009 | Cavanaugh | A01K 97/22 | 43/21.2 |
| 2014/0076910 A1 * | 3/2014 | McConnell | B65D 85/84 | 220/737 |
| 2018/0338623 A1 * | 11/2018 | Winterhalter | A47G 23/0225 | |
| 2022/0378030 A1 * | 12/2022 | Keskitalo | A01K 97/10 | |

* cited by examiner

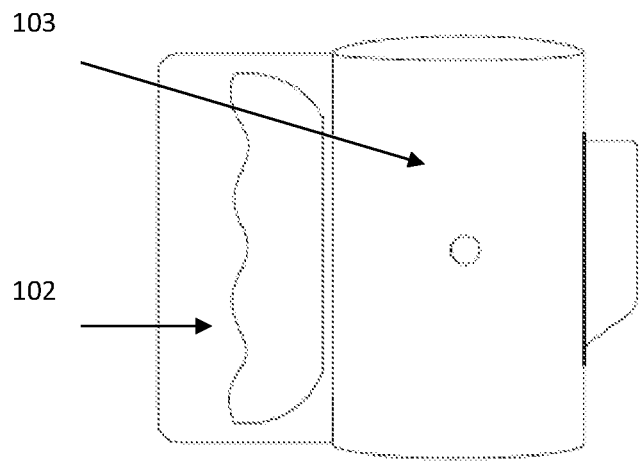
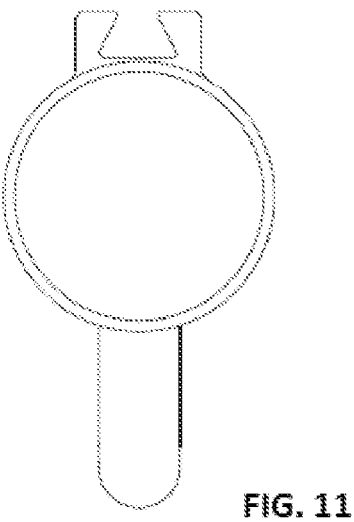
FIG. 10       FIG. 11
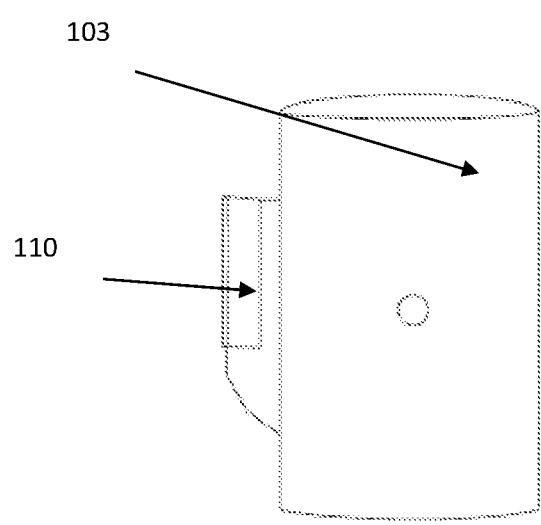
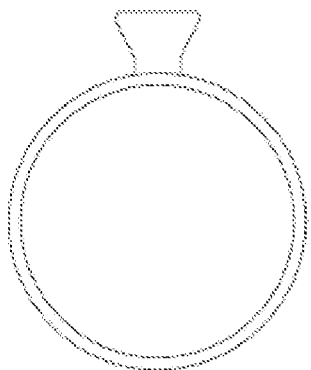
FIG. 12       FIG. 13

FISHING ROD SAND SPIKE HOLDER CARRY SYSTEM

CROSS-REFERENCE TO RELATED APPLICATION

This application claims priority to U.S. provisional application No. 62/959,982 filed Jan. 12, 2020, the contents of which is hereby incorporated by reference in its entirety.

FIELD OF THE INVENTION

The present invention relates to the fishing apparatuses. More specifically the present invention talks about hustle free way of carrying multiple fishing rods. The user does not need to hold the fishing rod for long hours to trap a fish as the invention provides a convenient way to make the fishing rod stand in a slanting position.

BACKGROUND OF THE INVENTION

Fishing is performed all over the world. In some places fishing is done for living and in other places it is treated as a sport. Conventionally wooden stick was used for performing the fishing activity. The wooden sticks were heavy and it was difficult to hold them in a slanting manner for long hours. To overcome the problem of heavy weight stick, metal rods were introduced. The metal rods were light in weight so it was easy to perform the fishing activity for long hours. But it was difficult to wrap up the thread when the fish is trapped on the hook of the fishing rod.

To solve this problem fishing reel was introduced. The fishing reel consists of a handle that is needed to be rotated clockwise or anticlockwise for releasing or wrapping the thread. But it is difficult to hold or carry multiple fishing rods in one time.

US20050102881A1 discloses about a fishing rod holder assembly for holding one or more fishing rods thereto. The fishing rod holder assembly includes two or more fishing rod holders each for holding a fishing rod therein; and a fishing rod holder support stanchion member having an anchoring post and a horizontal crossbar member connected thereto in an offset manner. The horizontal crossbar member includes a first opposing end having a first upwardly extending holding post connected thereto and a second opposing end having a second upwardly extending holding post connected thereto for forming a U-shaped configuration thereof. At least one of the fishing rod holders has a first attachment element mounted on the first upwardly extending holding post of the fishing rod holder support stanchion member and another one of the fishing rod holders has a second attachment element mounted on the second upwardly extending holding post of the fishing rod holder support stanchion member for forming a fishing rod holder assembly.

The disadvantage of prior art is that it cannot help the user in carrying the fishing rods from one place to other. Another problem is that the invention consists of multiple components so the user may face difficulty in assembling or dismantling the apparatus.

U.S. Pat. No. 4,523,704A discloses about a car top rod and reel carrier permits the user to store rods and reels in their assembled state ready for fishing. The apparatus includes a handle so that the carrier including the rods and reels can be carried as a unit. The apparatus also includes a top section connected by hinges to a bottom section. Semi-circular cut outs in the front and rear edges of the top and bottom sections create coaxial apertures for the fishing equipment. The rod portion passes through the first set of front apertures and the butt portion of the rod and reel combination passes through the second set of rear apertures. A cushion inside of the bottom section supports the reels. The apparatus is attached to the top of an automobile by means of adjustable gutter mounts. The device permits the user to store rods and reels in the "ready to go" state. Moreover, the entire unit may be removed from the automobile and carried to the fishing site conveniently.

The disadvantage of the prior art is that the invention cannot help the user in performing the fishing activity as the invention cannot hold the fishing rod in slanting manner Another problem is that the user cannot increase or decrease the fishing rod holding sections from the apparatus.

In order to overcome the above mentioned problems, there is a need to develop an apparatus to carry multiple fishing rods and also to hold the fishing rods in slanting position for trapping the fishes without being tired.

OBJECTS OF THE INVENTION

The principal object of the present invention is to overcome the disadvantages of the prior art.

An object of the present invention is to provide an apparatus to carry multiple fishing rods in one time.

Another object of the present invention is to provide an apparatus to reduce human efforts in trapping the fishes by holding the fishing rod for long hours.

Another object of the present invention is to provide an apparatus for holding fishing rods with easy assembling or dismantling components.

Yet another object of present invention is to provide an apparatus for holding bottle, cup or fishing tools while performing fishing activity.

The foregoing and other objects, features, and advantages of the present invention will become readily apparent upon further review of the following detailed description of the preferred embodiment as illustrated in the accompanying drawings.

SUMMARY OF THE INVENTION

The present invention contemplates about an apparatus for providing comfort in carrying multiple fishing rods at one time. The user may perform fishing activity without being tired of holding the fishing rods for long hours.

According to an embodiment of the present invention, a device rod holding apparatus, comprising, a number of hollow pipes installed in the apparatus for holding the fishing rods, connection assemblies attached to the pipes for griping the pipes together, a handle associated with the connection assembly for carrying the apparatus with single hand and a container coupled to the connection assembly for holding various objects.

While the invention has been described and shown with particular reference to the preferred embodiment, it will be apparent that variations might be possible that would fall within the scope of the present invention.

BRIEF DESCRIPTION OF THE DRAWINGS

Embodiments of the present disclosure will now be described, by way of example only, with reference to the following diagrams wherein:

FIGS. 10 to 20 illustrates a isometric view of different parts of the connection assembly with their sliding lock mechanism.

DETAILED DESCRIPTION OF THE INVENTION

The following description includes the preferred best mode of one embodiment of the present invention. It will be clear from this description of the invention that the invention is not limited to these illustrated embodiments but that the invention also includes a variety of modifications and embodiments thereto. Therefore the present description should be seen as illustrative and not limiting. While the invention is susceptible to various modifications and alternative constructions, it should be understood, that there is no intention to limit the invention to the specific form disclosed, but, on the contrary, the invention is to cover all modifications, alternative constructions, and equivalents falling within the spirit and scope of the invention as defined in the claims.

In any embodiment described herein, the open-ended terms "comprising," "comprises," and the like (which are synonymous with "including," "having" and "characterized by") may be replaced by the respective partially closed phrases "consisting essentially of," "consists essentially of," and the like or the respective closed phrases "consisting of," "consists of," the like.

As used herein, the singular forms "a," "an," and "the" designate both the singular and the plural, unless expressly stated to designate the singular only.

The present invention discloses about a fishing rod holding apparatus for making fishing activity easier by holding multiple fishing rod in a slanting position to help the user in trapping the fishes without being tired.

Figure 5:
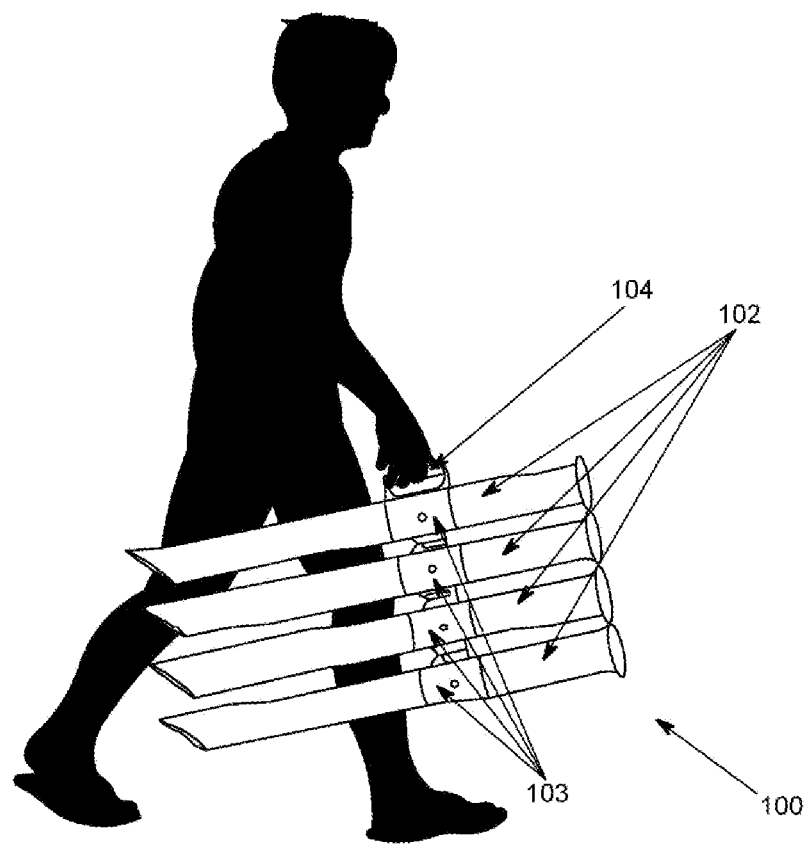
FIG. 5 illustrates a isometric view of the fishing rod holding apparatus carried by a user from a single hand.

Referring to FIG. 5, illustrates schematic view of the fishing rod holding apparatus, wherein the apparatus 100 comprises, a number of hollow pipes 102 installed in the apparatus. The pipes 102 are to hold the fishing rods 107. A user may increase or decrease the number of pipes 102 according to the number of fishing rods 107 needed to be carried. The pipes 102 are basically poly vinyl chloride (PVC) pipes 101.

Figure 2:
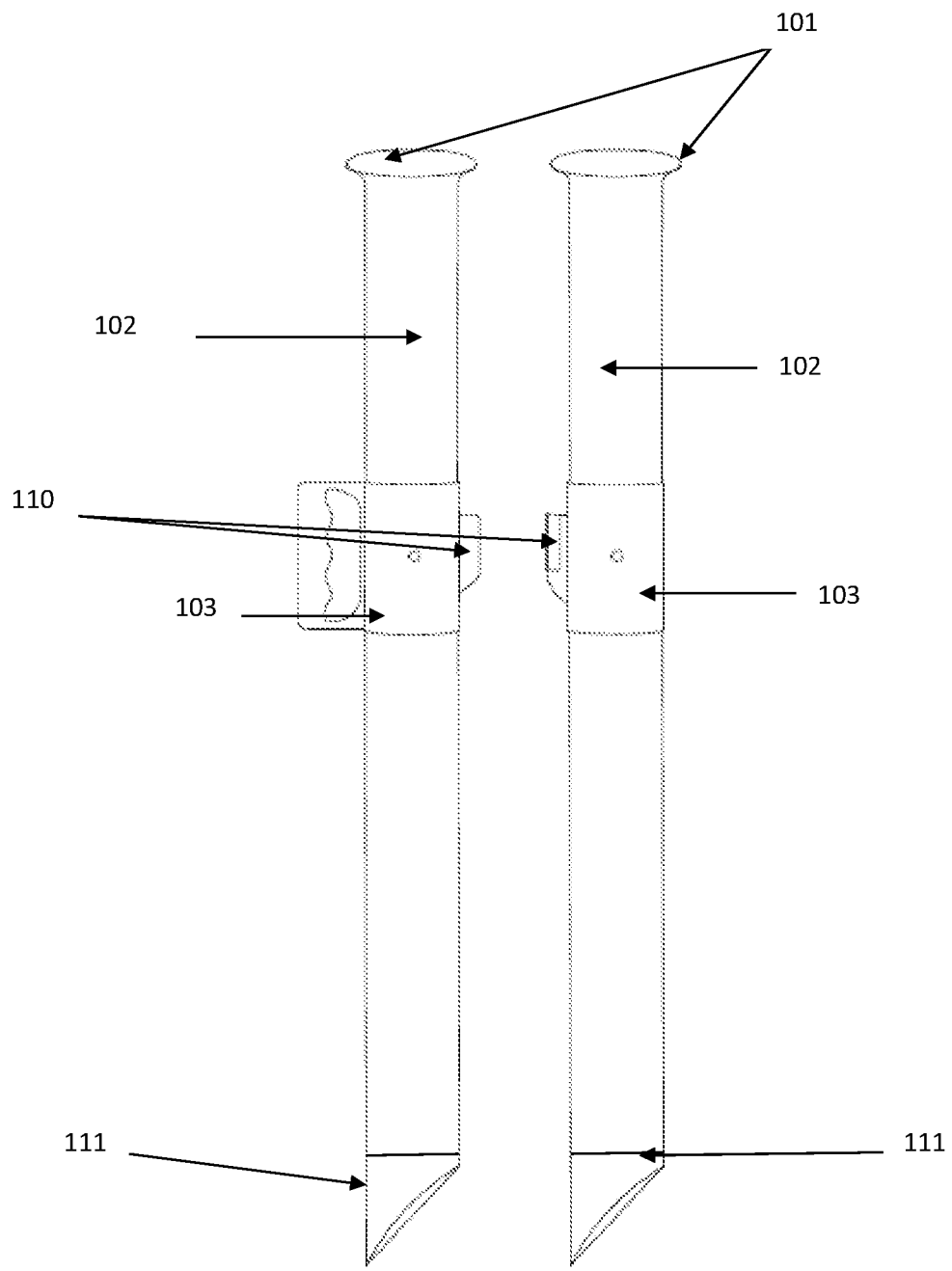
FIG. 2 illustrates a schematic view of the fishing rod holding apparatus of at least two hollow pipes and two connection assembly.
Figure 3:
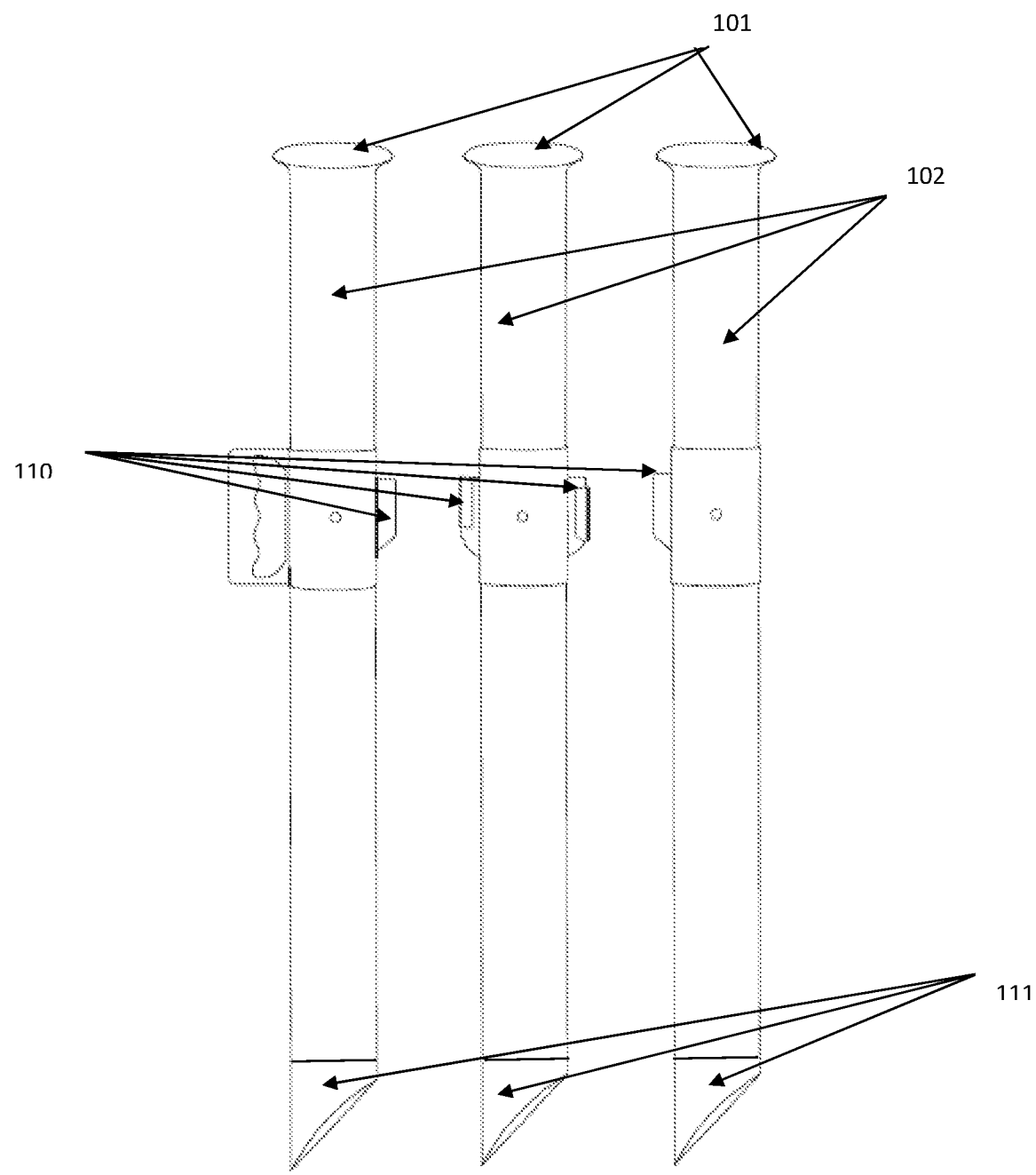
FIG. 3 illustrates a schematic view of the fishing rod holding apparatus of at least three hollow pipes and three connection assembly.

Referring to FIG. 2, a first side of the pipes 102 consists of curved edges for providing smooth insertion of the fishing rod 107. The smooth insertion protects the fishing rod 107 from scratches. The first side is the top side. The edges on the upper side of the pipes 102 are in circular shape. As the pipes 102 are made from poly vinyl chloride, the pipes 102 are very light weight that makes the apparatus 100 easily transportable.

Figure 4:
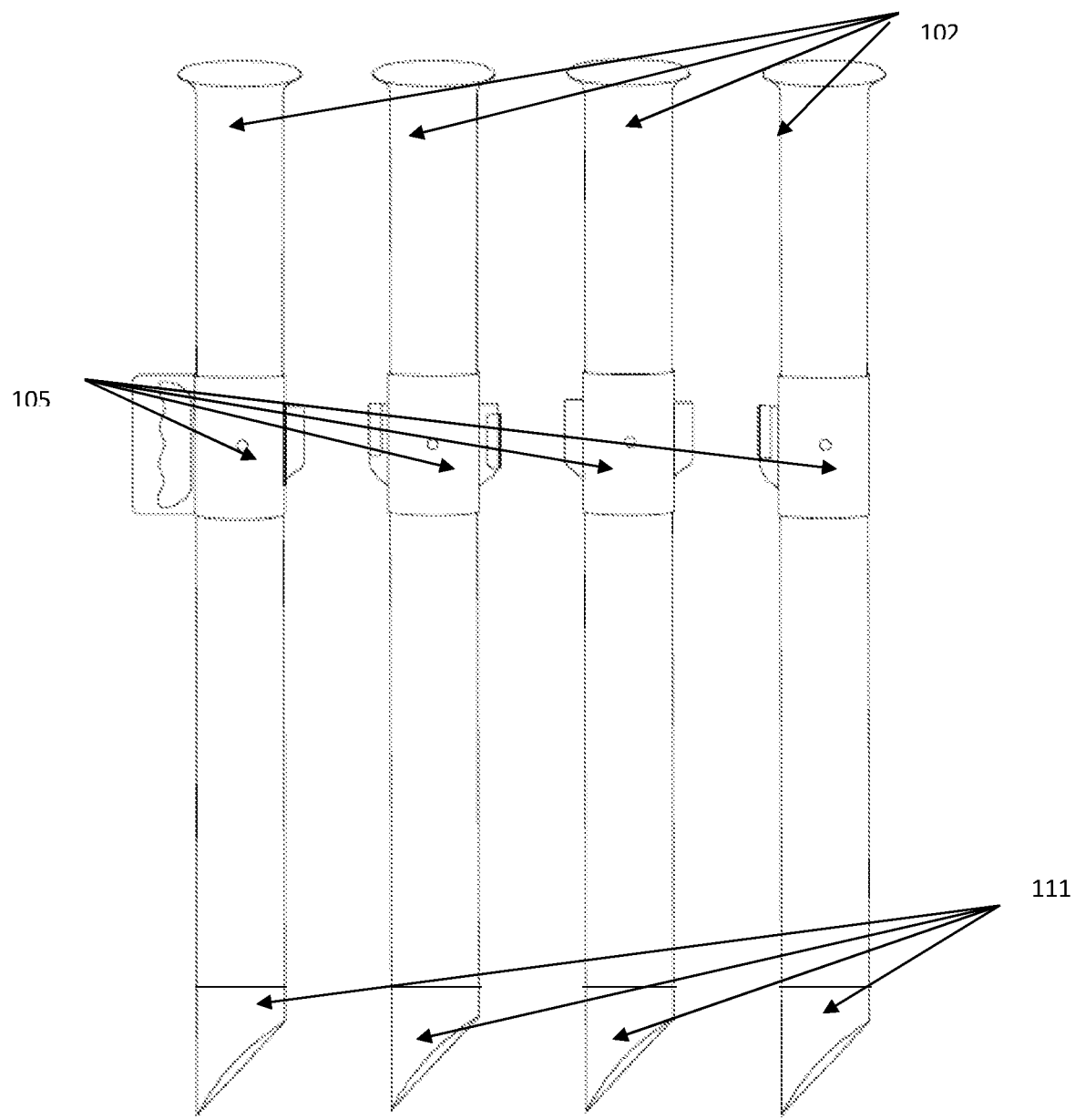
FIG. 4 illustrates a schematic view of the fishing rod holding apparatus of at least four hollow pipes and four connection assembly.

Referring to FIG. 4, a second side 111 of the pipes 102 consists of an edge preferably of metal for easily penetrating the pipe 102 in sand ground. The second side 111 is the bottom side. The edge on the second side 111 is in oval shape. The pipes 102 are penetrated in the sand ground in such a way that the pipes 102 stand in a slanting manner, near about 45 degrees. This helps the user to make the fishing rods 107 stand in this position for trapping the fishes by using multiple rods.

Figure 1:
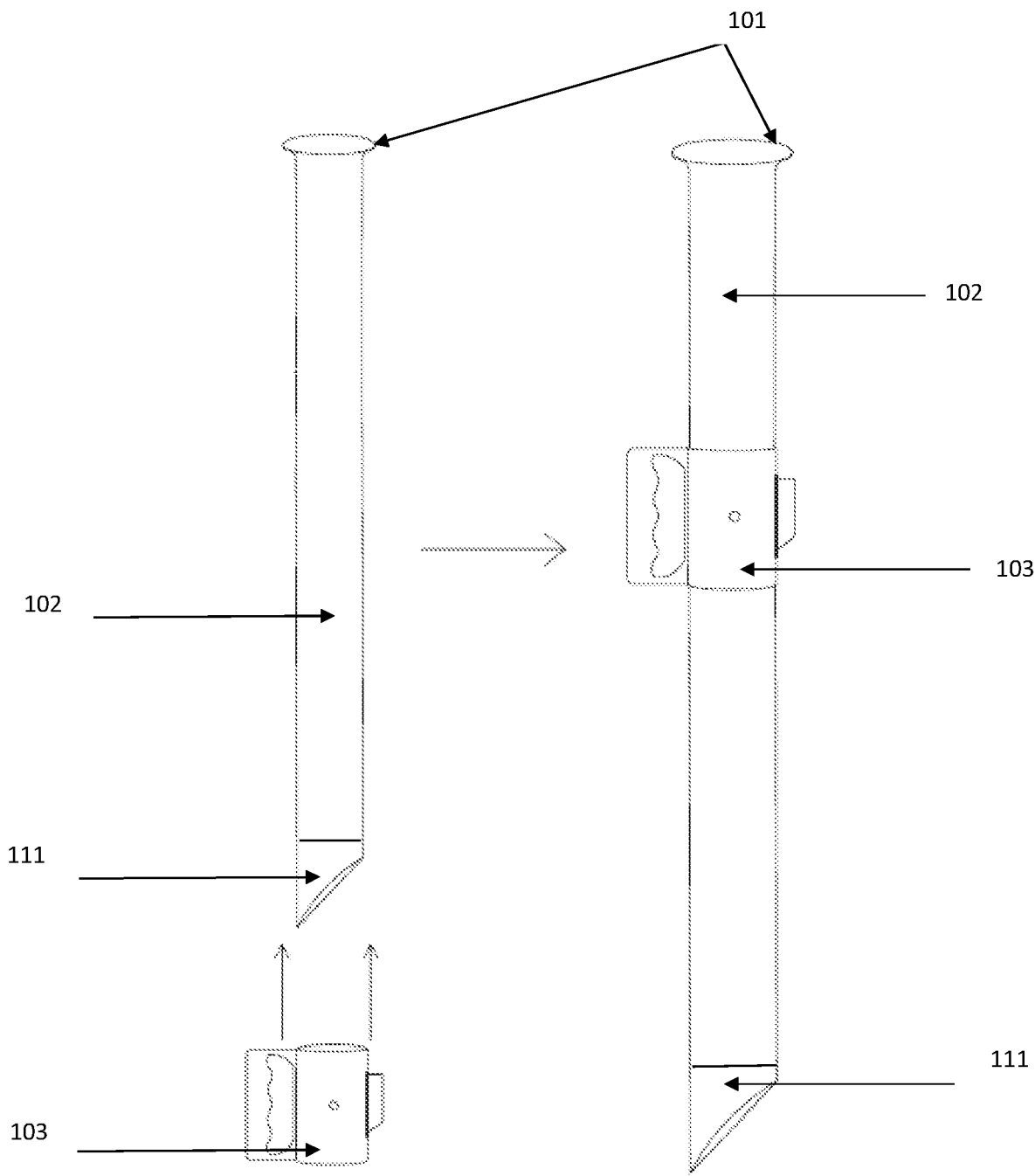
FIG. 1 illustrates a schematic view of the fishing rod holding apparatus.
Figure 8:
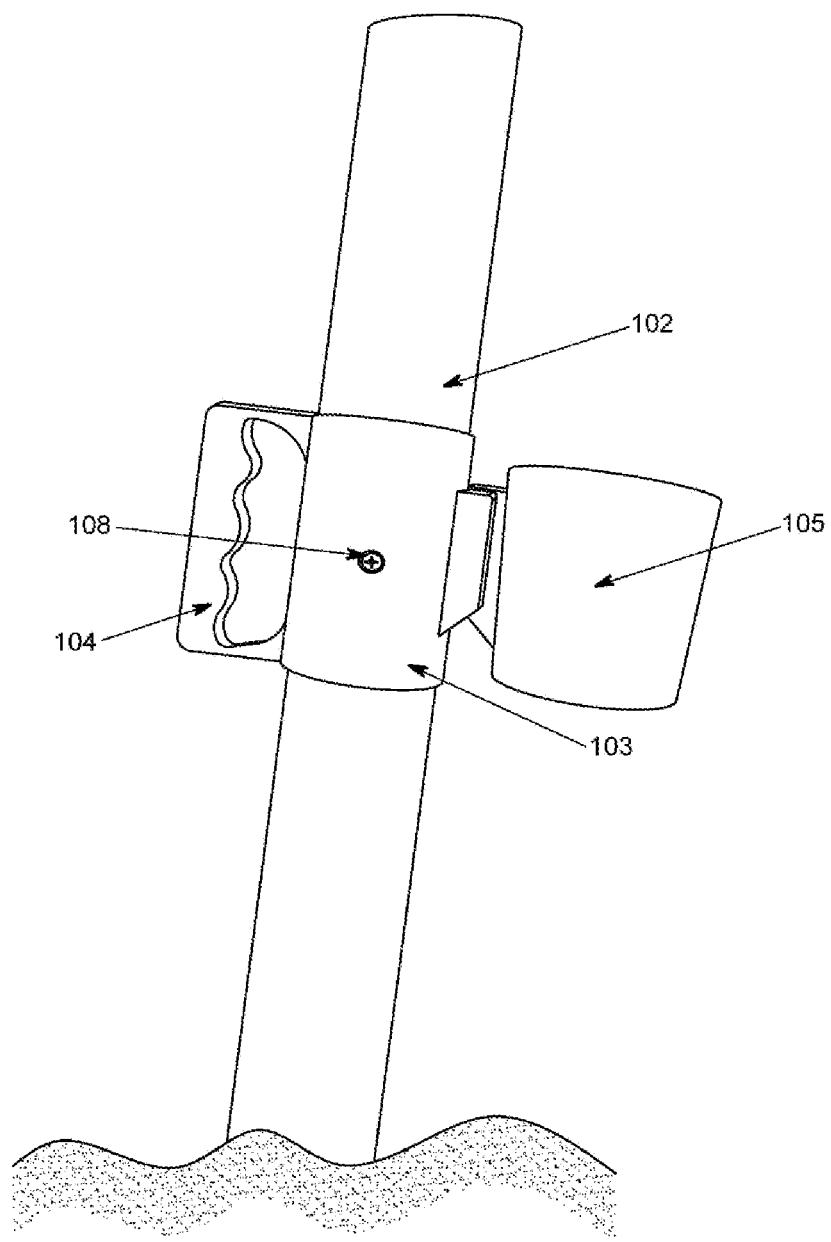
FIG. 8 illustrates schematic view of the attachment of the connection assembly with the hollow pipe by a screw.

Referring to FIGS. 1 and 8, the Connection assemblies are attached to the pipes 102. Numbers of screw 108 are used for attaching the connection assemblies with the pipes 102. The connection assemblies are used for gripping the pipes 102 together. The connection assemblies consist of slide lock mechanism 110. The slide lock mechanism 110 helps in gripping the pipes 102 together.

Referring to FIG. 10, illustrates the first part of the connection assembly 103. The first part of the connection assembly 103 consists of a handle 104 on one side for holding the apparatus 100 and the sliding lock mechanism 110 on another side. The sliding lock mechanism 110 is to lock the second part of the connection assembly 103 with the first part.

Figure 20:
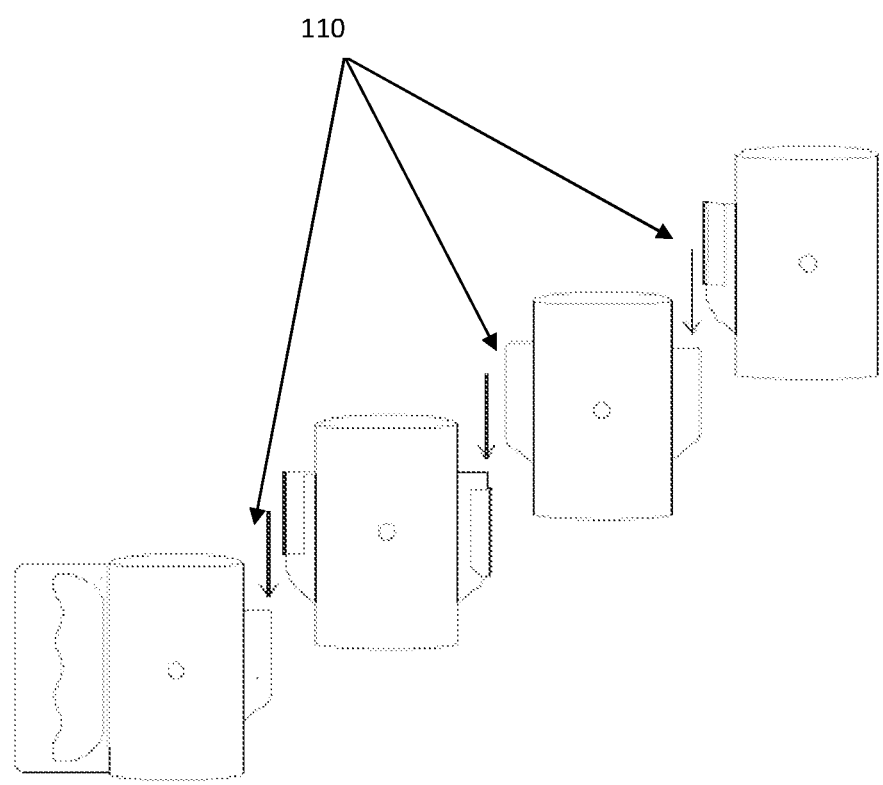

Referring to FIG. 20, illustrates the attachment of the parts of the connection assembly 103. The attachment of each part is done in such a manner that the sliding lock mechanism 110 on the right side of a part of connection assembly 103 locks with the sliding lock mechanism 110 on the left side of a part of connection assembly 103.

Figure 6:
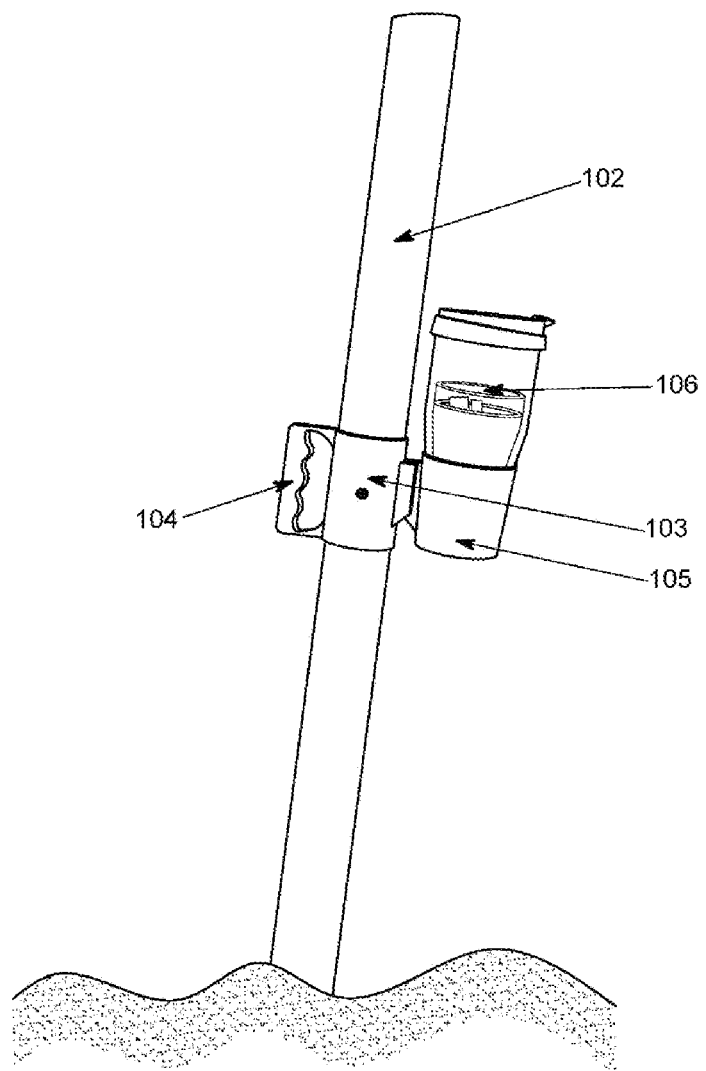
FIG. 6 illustrates a schematic view of the fishing rod holding apparatus having object holder.

Referring to FIG. 6, the handle 104 is associated with the connection assembly. The handle 104 is to carry the apparatus 100 from a single hand. The inside edge of the handle 104 consists of multiple curves for providing better grip to the user. The user may grip the handle 104 while inserting the pipes 102 in the sand ground.

Figure 7:
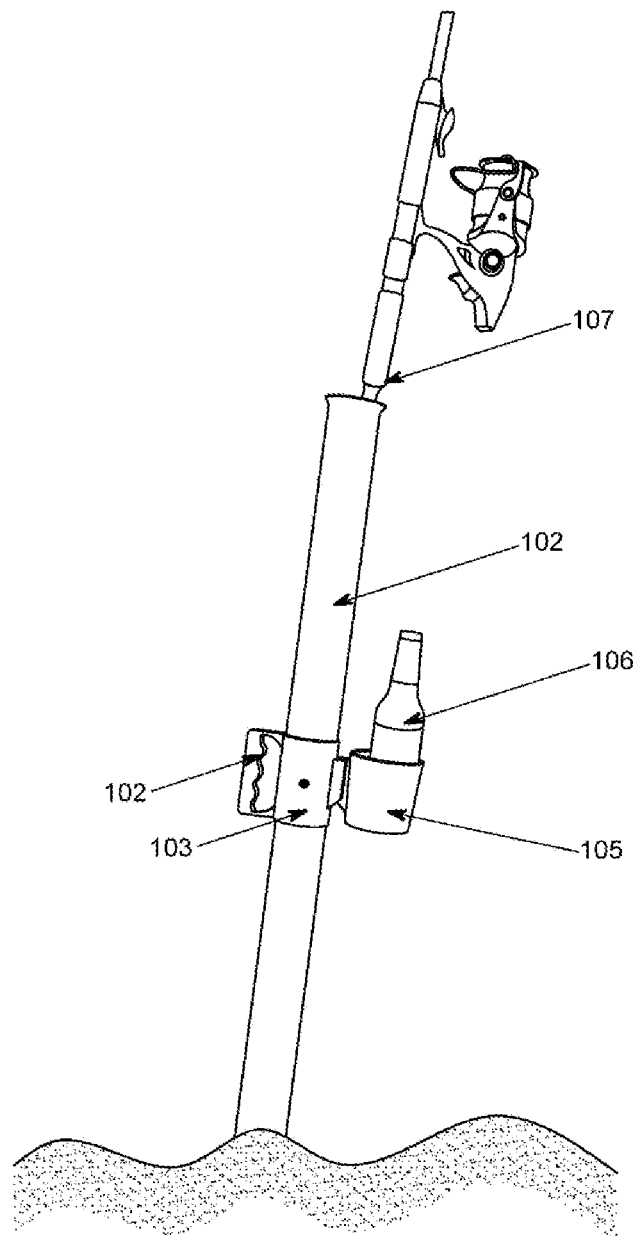
FIG. 7 illustrates a schematic view of the fishing rod holding apparatus with a fishing rod inserted inside the hollow pipe.
Figure 9:
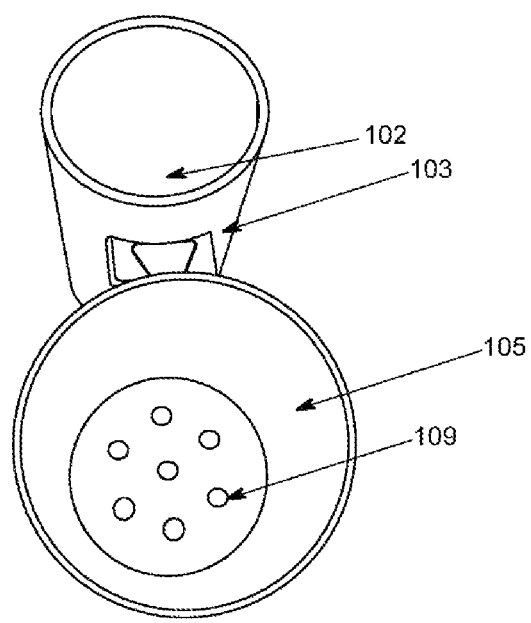
FIG. 9 illustrates an upper view of the container.
Figure 14:
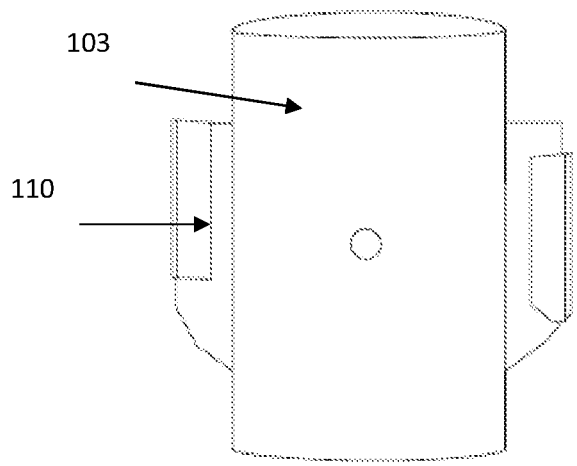
Figure 15:
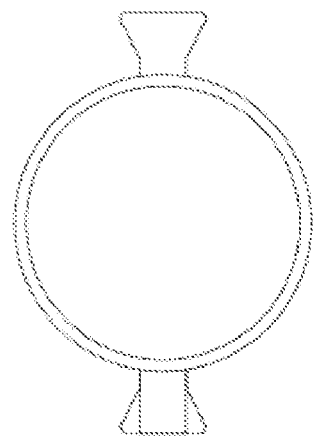
Figure 16:
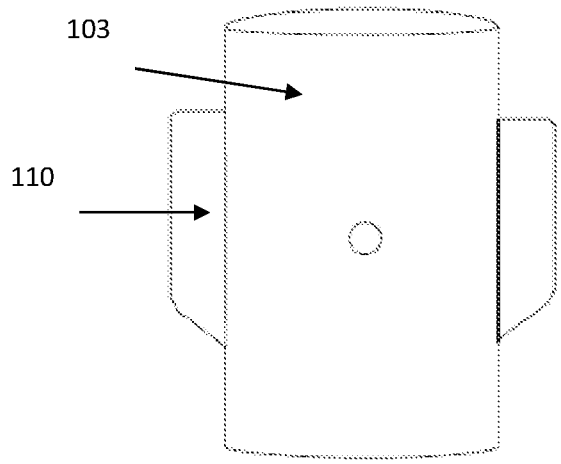
Figure 17:
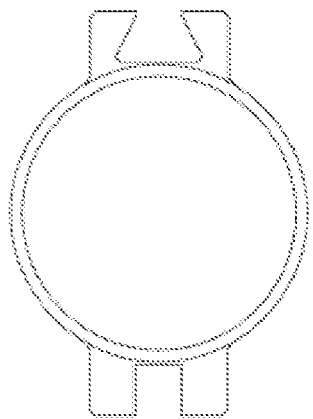
Figure 18:
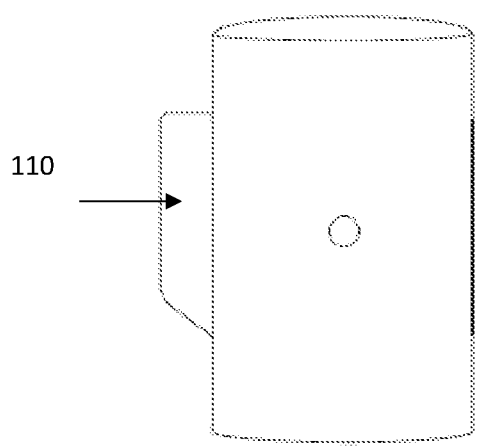
Figure 19:
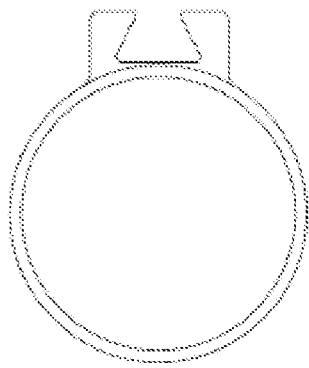

Referring to FIGS. 7 and 9, a container 105 is coupled to the connection assembly. The container 105 is to hold various objects 106 as per requirement of the user for example bottle, cup or fishing tools. The container 105 consists of number of holes 109 for draining out any liquid spilled in the container 105.

The user does not need to face any difficulty in carrying number of fishing rods 107 in one time. The user may easily sit for long hours for fishing without getting tired as the invention holds the fishing rod in a slanting manner.

Although the field of the invention has been described herein with limited reference to specific embodiments, this description is not meant to be construed in a limiting sense. Various modifications of the disclosed embodiments, as well as alternate embodiments of the invention, will become apparent to persons skilled in the art upon reference to the description of the invention.

I claim:

1. An apparatus for holding a plurality of fishing rods, comprising:
    a plurality of hollow pipes including at least a first hollow pipe, a second hollow pipe, a third hollow pipe, and a fourth hollow pipe;
    each of said hollow pipes being configured to be able to hold one of said fishing rods, each of said hollow pipes including atop end comprising an opening having an outwardly curving upper edge for providing smooth insertion of said respective fishing rod, and an oval-cross-sectioned metal bottom end cut diagonally relative to a long axis of said respective pipe so as to make said bottom end pointed to facilitate easy penetration of aground surface comprising sand;

a first connection assembly secured around the first hollow pipe such that the first hollow pipe is secured within the first connection assembly, the first connection assembly comprising a handle on one side of the first connection assembly for carrying said apparatus and a first sliding lock mechanism on a directly opposite side of said connection assembly from the handle;

a second connection assembly secured around the second hollow pipe such that the second hollow pipe is secured within the second connection assembly, the second connection assembly comprising a second sliding lock mechanism configured such that the first and second sliding lock mechanisms are able to lock with each other to hold the first and second hollow pipes together;

a third connection assembly secured around the third hollow pipe such that the third hollow pipe is secured within the third connection assembly; the second connection assembly further comprises a third sliding lock mechanism on a directly opposite side of the second connection assembly from the second sliding lock mechanism; the third connection assembly comprises a fourth sliding lock mechanism configured such that the third and fourth sliding lock mechanisms are able to lock with each other to hold the second and third hollow pipes together;

a fourth connection assembly secured around the fourth hollow pipe such that the fourth hollow pipe is secured within the fourth connection assembly; the third connection assembly further comprises a fifth sliding lock mechanism on a directly opposite side of the second connection assembly from the fourth sliding lock mechanism; the fourth connection assembly comprises a sixth sliding lock mechanism configured such that the fifth and sixth sliding lock mechanisms are able to lock with each other to hold the third and fourth hollow pipes together such that when the first through fourth hollow pipes are held together by the plurality of connection assemblies as recited by the claims, the first through fourth hollow pipes are essentially parallel and coplanar with one another;

wherein each connection assembly is attached to a respective hollow pipe by a screw; and wherein the apparatus further comprises a container coupled to one of said connection assemblies, the container being large enough to hold a bottle, cup, or fishing tools and being equipped with a plurality of holes for draining out any liquid spilled into said container.

\* \* \* \* \*